(12) United States Patent
Zhou et al.

(10) Patent No.: US 11,665,696 B2
(45) Date of Patent: May 30, 2023

(54) ACTION TIME FOR APPLYING DOWNLINK CONTROL INFORMATION BASED BEAM AND REFERENCE SIGNAL ACTIVATION COMMAND

(71) Applicant: QUALCOMM Incorporated, San Diego, CA (US)

(72) Inventors: Yan Zhou, San Diego, CA (US); Tao Luo, San Diego, CA (US); Qian Zhang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 16/948,156

(22) Filed: Sep. 4, 2020

(65) Prior Publication Data

US 2021/0185646 A1   Jun. 17, 2021

Related U.S. Application Data

(60) Provisional application No. 62/947,934, filed on Dec. 13, 2019.

(51) Int. Cl.
*H04W 72/04* (2009.01)
*H04W 72/044* (2023.01)

(52) U.S. Cl.
CPC ....... *H04W 72/042* (2013.01); *H04W 72/046* (2013.01)

(58) Field of Classification Search
CPC .............. H04W 72/042; H04W 72/046; H04L 5/0098; H04L 5/0094; H04L 5/0053; H04L 5/0092; H04L 5/005; H04B 7/0404; H04B 7/0695
See application file for complete search history.

(56) References Cited

U.S. PATENT DOCUMENTS

| | | |
|---|---|---|
| 2017/0346544 A1 | 11/2017 | Islam et al. |
| 2018/0205469 A1* | 7/2018 | Nagaraja ............... H04L 1/0026 |
| 2019/0174466 A1* | 6/2019 | Zhang ..................... H04L 5/005 |
| 2019/0199497 A1* | 6/2019 | Park ...................... H04L 5/0048 |
| 2019/0260456 A1 | 8/2019 | Zhou et al. |
| 2020/0068548 A1* | 2/2020 | Guan .................. H04W 72/042 |

(Continued)

FOREIGN PATENT DOCUMENTS

WO     WO-2019143900 A1     7/2019

OTHER PUBLICATIONS

International Search Report and Written Opinion—PCT/US2020/070662—ISA/EPO—dated Feb. 4, 2021.

(Continued)

*Primary Examiner* — Kiet Tang
(74) *Attorney, Agent, or Firm* — Harrity & Harrity, LLP (57) ABSTRACT

Various aspects of the present disclosure generally relate to wireless communication. In some aspects, a user equipment (UE) may receive downlink control information (DCI) that includes a downlink and/or uplink beam activation command or a reference signal activation command. The UE may apply the downlink and/or uplink beam activation command or the reference signal activation command included in the DCI according to an action time that is based at least in part on a quantity of symbols after an event related to reception of the DCI. Numerous other aspects are provided.

34 Claims, 6 Drawing Sheets

(56) References Cited

U.S. PATENT DOCUMENTS

2020/0196383 A1* 6/2020 Tsai ................. H04L 5/0092
2020/0358487 A1* 11/2020 Yang ................ H04W 72/042

OTHER PUBLICATIONS

QUALCOMM: "Beam Management for NR", 3GPP Draft, 3GPP TSG-RAN WG1 #90bis, R1-1718541, 3rd Generation Partnership Project (3GPP), Mobile Competence Centre, 650, Route Des Lucioles, F-06921 Sophia-Antipolis Cedex, France, vol. RAN WG1, No. Prague. P.R. Czechia, Oct. 9, 2017-Oct. 13, 2017, Oct. 8, 2017, XP051341723, 17 pages, Retrieved from the Internet: URL:http://www.3gpp.org/ftp/tsg_ran/WG1_RL1/TSGR1_90b/Docs/, http://www.3gpp.org/ftp/tsg_ran/WG1_RL1/TSGR1_90b/Docs/ [retrieved on Oct. 8, 2017], fig. 1 +par. 3. 1. 1, 4 .,6.,9, fig 0-1.

* cited by examiner

ACTION TIME FOR APPLYING DOWNLINK CONTROL INFORMATION BASED BEAM AND REFERENCE SIGNAL ACTIVATION COMMAND

CROSS-REFERENCE TO RELATED APPLICATION

This Patent Application claims priority to U.S. Provisional Patent Application No. 62/947,934, filed on Dec. 13, 2019, entitled "ACTION TIME FOR APPLYING DOWNLINK CONTROL INFORMATION BASED BEAM AND REFERENCE SIGNAL ACTIVATION COMMAND," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for defining an action time for applying a downlink control information (DCI) based beam activation command and/or a DCI based reference signal activation command.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: receiving downlink control information (DCI) that includes a downlink and/or uplink beam activation command or a reference signal activation command; and applying the downlink and/or uplink beam activation command or the reference signal activation command included in the DCI according to an action time that is based at least in part on a quantity of symbols after an event related to reception of the DCI.

In some aspects, a UE for wireless communication may include a memory and one or more processors operatively coupled to the memory. The memory and the one or more processors may be configured to: receive DCI that includes a downlink and/or uplink beam activation command or a reference signal activation command; and apply the downlink and/or uplink beam activation command or the reference signal activation command included in the DCI according to an action time that is based at least in part on a quantity of symbols after an event related to reception of the DCI.

In some aspects, a non-transitory computer-readable medium may store one or more instructions for wireless communication. The one or more instructions, when executed by one or more processors of a UE, may cause the one or more processors to: receive DCI that includes a downlink and/or uplink beam activation command or a reference signal activation command; and apply the downlink and/or uplink beam activation command or the reference signal activation command included in the DCI according to an action time that is based at least in part on a quantity of symbols after an event related to reception of the DCI.

In some aspects, an apparatus for wireless communication may include: means for receiving DCI that includes a downlink and/or uplink beam activation command or a reference signal activation command; and means for applying the downlink and/or uplink beam activation command or the reference signal activation command included in the DCI according to an action time that is based at least in part on a quantity of symbols after an event related to reception of the DCI.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
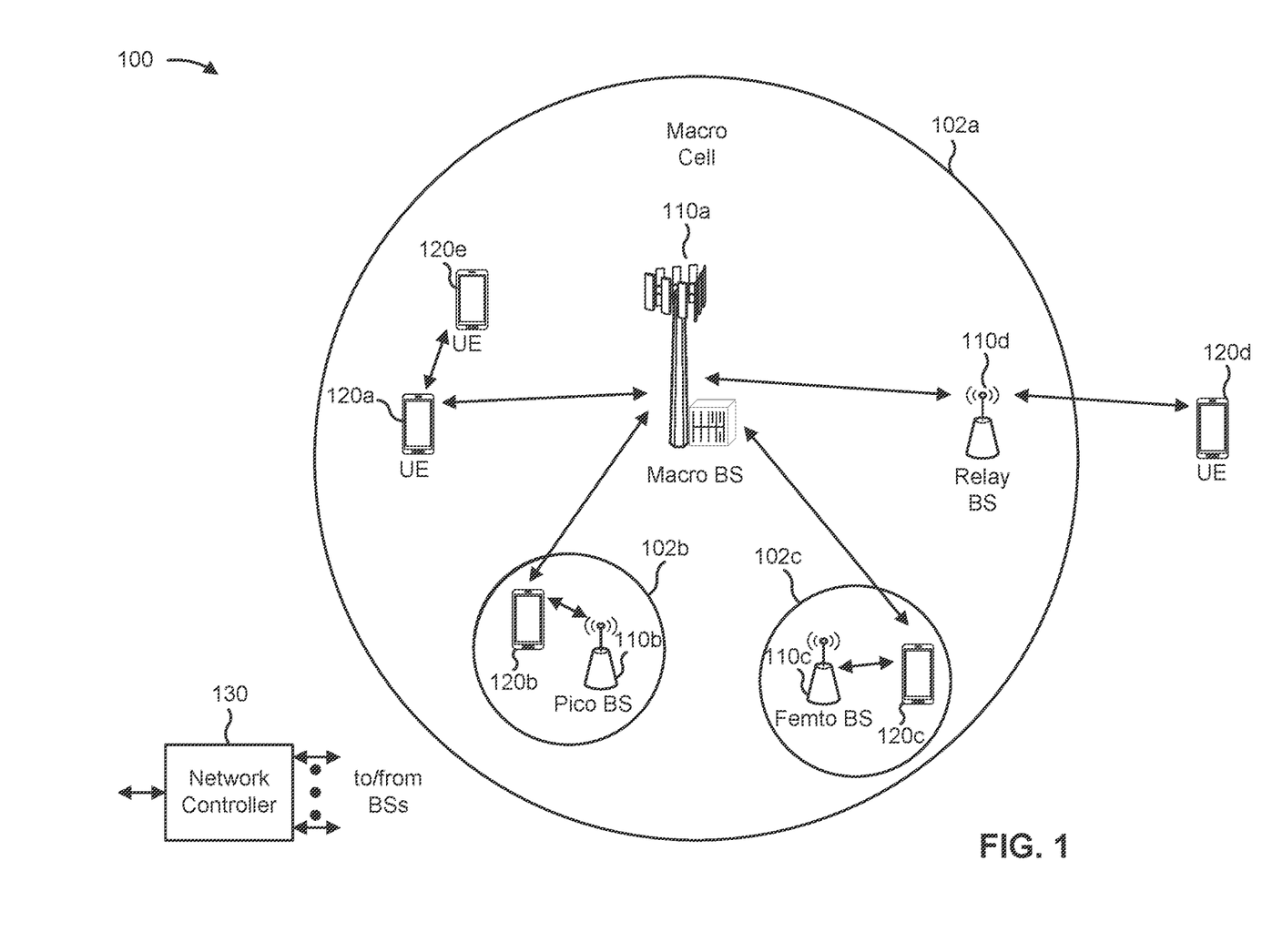
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG.

1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Wireless communication devices, such as UEs 120, base stations 110, transmit-receive points (TRPs), and/or the like, may communicate with each other using beams. A beam may be defined using a transmission configuration indicator (TCI) state. A TCI state for a beam may indicate a source reference signal and a quasi-colocation (QCL) type to be used for the beam. The QCL type may correspond to one or more QCL relationships that indicate how the source reference signal is to be quasi-colocated (QCLed) with a channel on the beam. Two antenna ports are said to be QCLed if properties of the channel over which a symbol on one antenna port (e.g., the channel on the beam) is conveyed can be inferred from the channel over which a symbol on the other antenna port is conveyed (e.g., the source reference signal). Examples of QCL relationships that can be bundled in QCL types include Doppler shift, Doppler spread, average delay, delay spread, and a spatial receive parameter. Thus, properties of the beam can be derived from the properties of the source reference signal.

In some cases, a UE 120 and a base station 110 may perform beam management (sometimes abbreviated BM) to establish and/or refine beams for communication between the UE 120 and the base station 110. Beam management may enable intra-cell mobility (e.g., as a physical orientation of a UE 120 changes, as clusters or blocking objects in the channel change, and/or the like) and inter-cell mobility (e.g., when a UE 120 is handed over from one base station 110 to another base station 110 in the wireless network 100 or another wireless network), among other procedures.

As indicated above, FIG. 1 is provided as an example. Other examples may differ from what is described with regard to FIG. 1.

Figure 2:
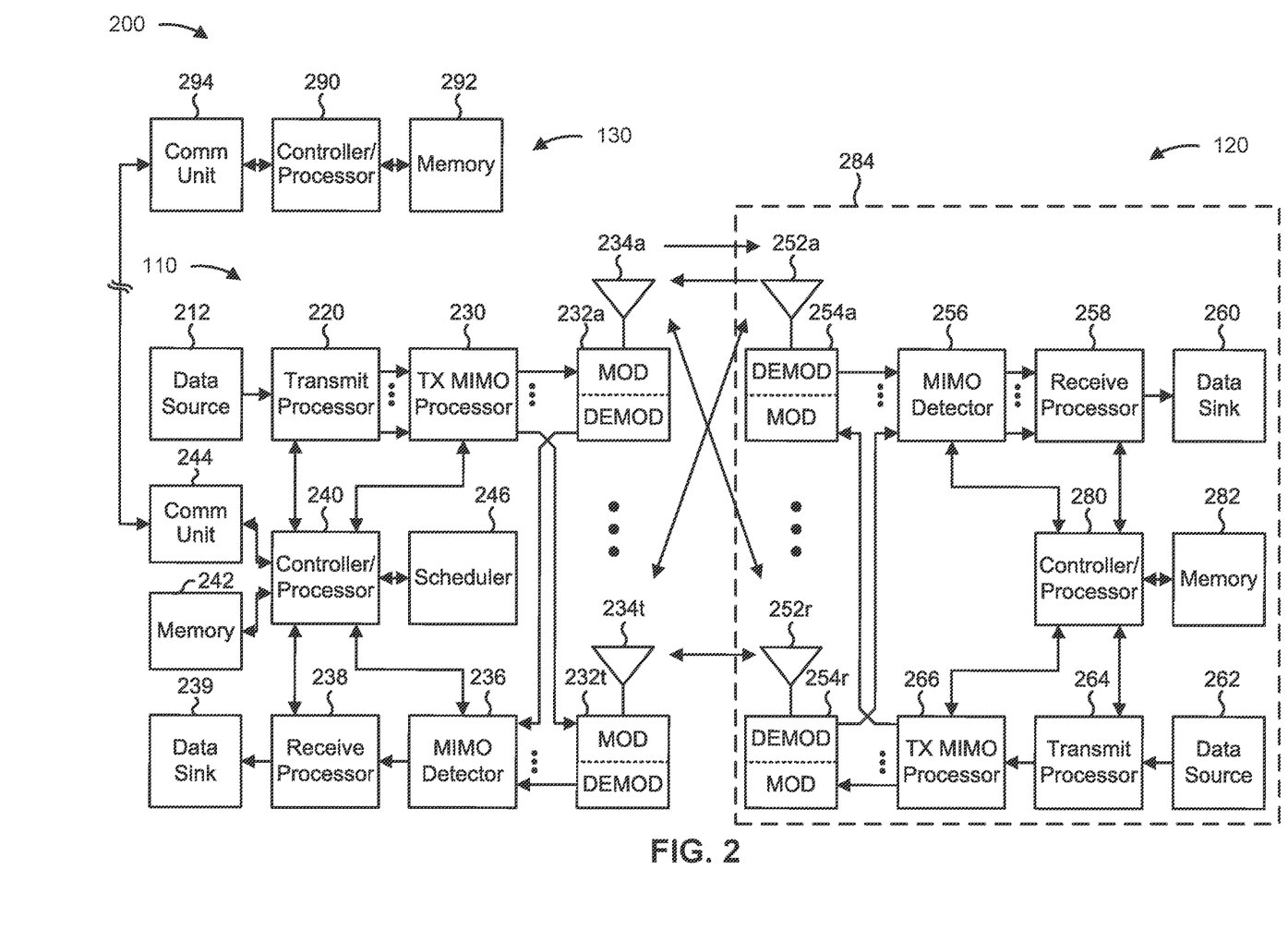
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with an action time for applying a downlink control information (DCI) based beam activation command and/or a DCI based reference signal activation command, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 400 of FIG. 4 and/or other processes as described herein. In some aspects, executing instructions may include running the instructions, converting the instructions, compiling the instructions, interpreting the instructions, and/or the like.

In some aspects, UE 120 may include means for receiving DCI that includes a downlink and/or uplink beam activation command or a reference signal activation command, means for applying the downlink and/or uplink beam activation command or the reference signal activation command included in the DCI according to an action time that is based at least in part on a quantity of symbols after an event related to reception of the DCI, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Wireless communication devices, such as UEs, base stations, transmit-receive points (TRPs), and/or the like, may communicate with each other using beams. A beam may be defined using a transmission configuration indicator (TCI) state. A TCI state for a beam may indicate a source reference signal and a quasi-colocation (QCL) type to be used for the beam. The QCL type may correspond to one or more QCL relationships that indicate how the source reference signal is to be quasi-colocated (QCLed) with a channel on the beam. Two antenna ports are said to be QCLed if properties of the channel over which a symbol on one antenna port (e.g., the channel on the beam) is conveyed can be inferred from the channel over which a symbol on the other antenna port is conveyed (e.g., the source reference signal). Examples of QCL relationships that can be bundled in QCL types include Doppler shift, Doppler spread, average delay, delay spread, and a spatial receive parameter. In this way, properties of the beam can be derived from the properties of the source reference signal.

In some cases, a base station and/or a UE may be capable of downlink and/or uplink beam management. In this case, the base station may configure one or more beam management parameters, activate and/or deactivate one or more uplink and/or downlink beams, and/or the like for the UE. As an example, the base station may configure, activate, and/or deactivate uplink and/or downlink TCI states, such as physical downlink control channel (PDCCH) TCI states, physical downlink shared channel (PDSCH) TCI states, channel state information reference signal (CSI-RS) TCI states, physical uplink control channel (PUCCH) TCI states, physical uplink shared channel (PUSCH) TCI states, physical random access channel (PRACH) TCI states, sounding reference signal (SRS) TCI states, and/or the like. As another example, the base station may configure, activate, and/or deactivate uplink spatial relations (e.g., which may include indications of beam and/or base station co-location, quasi-co-location, and/or the like), such as PUCCH spatial relations, SRS spatial relations, and/or the like.

Moreover, the base station may configure one or more reference signal parameters, activate and/or deactivate reference signal transmission for the UE, and/or the like. For example, in some aspects, the reference signal may be a path loss reference signal that the base station and/or the UE use to track, manage, and compensate for mobility of the base station and/or the UE in the wireless network. For example, the base station may configure path loss reference signal parameters that indicate one or more time and frequency resources in which the UE is to transmit the path loss reference signal, that configure the UE to periodically, semi-persistently, or aperiodically transmit the path loss reference signal, and/or the like.

In some circumstances, a UE and a base station (or any other suitable transmitter device and receiver device) may perform beam management to establish and/or refine the beam management parameters and/or reference signal parameters. Accordingly, beam management may enable intra-cell mobility (e.g., as a physical orientation of a UE changes, as clusters or blocking objects in the channel change, and/or the like) and inter-cell mobility (e.g., when a UE is handed over from one base station to another base station), among other procedures. In some circumstances, however, the beam management parameters and/or reference signal parameters for a UE may change frequently. For example, a UE may encounter frequent blockages or may change position or orientation quickly. In these circumstances, significant latency and overhead may occur, thus consuming computing resources. For example, there may be latency and overhead involved in transmitting and measuring reference signals, communicating regarding beam configuration or identity, and/or the like.

When a beam changes, a base station may switch an active beam configuration from one beam configuration to another beam configuration. For example, the beam configuration may include an uplink beam configuration, a downlink beam configuration, a reference signal configuration, and/or the like. This may be referred to as activating the uplink beam configuration, the downlink beam configuration, or the reference signal configuration. If higher-layer signaling (e.g., radio resource control (RRC) signaling, medium access control (MAC) signaling, such as a MAC control element (MAC-CE), and/or the like) is used to transmit uplink and/or downlink beam activation information and/or reference signal activation information, the UE may experience significant latency (e.g., multiple milliseconds or more) while processing the higher-layer signaling and applying the activation command.

Some techniques and apparatuses described herein provide physical layer signaling of downlink and/or uplink beam activation commands, reference signal activation commands, and/or the like, which may be used to activate an uplink beam configuration, a downlink beam configuration, a reference signal configuration, and/or the like. In some aspects, a base station may transmit the downlink and/or uplink beam activation commands and/or the reference signal activation commands in a (physical layer) DCI communication, which may reduce latency and overhead in beam and/or reference signal management processes relative to approaches in which downlink and/or uplink beam activation commands and/or the reference signal activation commands are communicated using higher-layer signaling, such as a radio resource control (RRC) message, a MAC-CE, and/or the like.

Figure 3A:
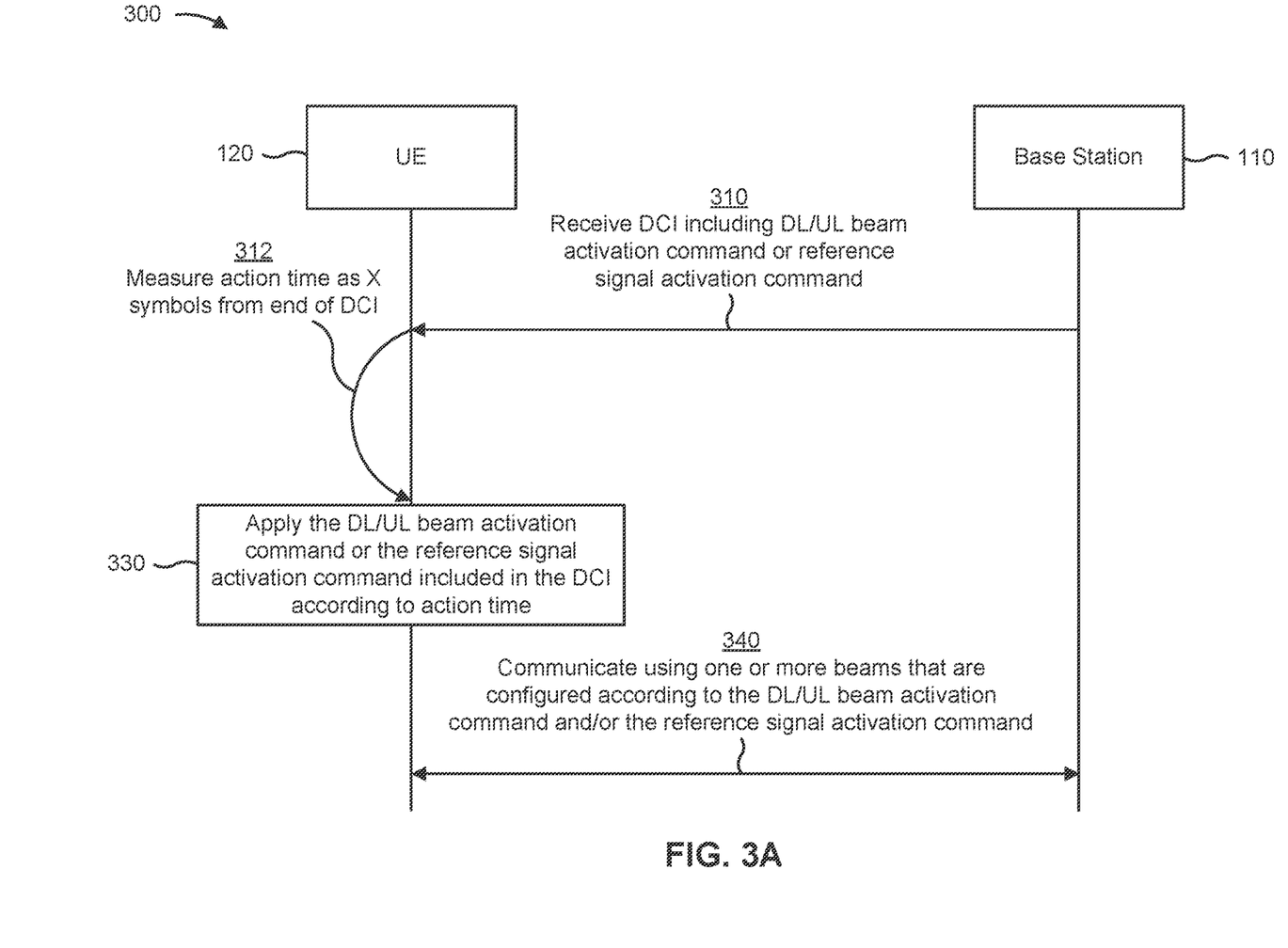
FIGS. 3A-3B are diagrams illustrating one or more examples of an action time for applying a downlink control information (DCI) based beam activation and/or a DCI based reference signal activation command, in accordance with various aspects of the present disclosure.
Figure 3B:
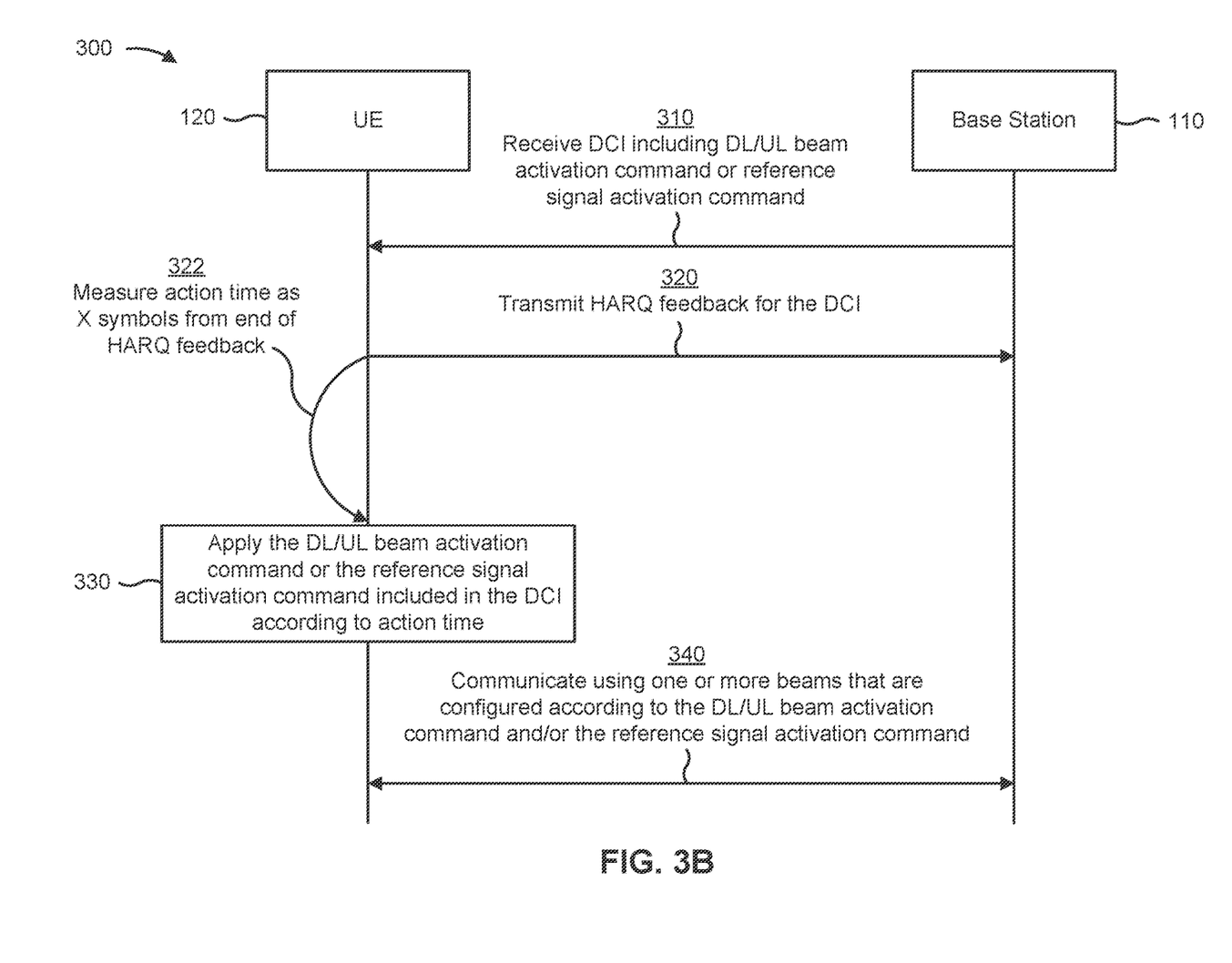

In some aspects, to coordinate a time when the base station and the UE start to communicate using one or more beams and/or reference signals that are configured in a DCI based downlink and/or uplink beam activation command, a DCI based reference signal activation command, and/or the like, the UE may determine an action time at which, or after which, the beam activation command and/or the reference signal activation command are to be applied. For example, in some aspects, the action time may be defined as a quantity of symbols after an event related to reception of the DCI (e.g., an end of the DCI communication, an end of a transmission of hybrid automatic repeat request (HARQ) feedback that indicates whether the UE successfully decoded the DCI communication, and/or the like). Furthermore, in cases where the base station transmits the DCI to the UE in multiple repetitions and/or the UE transmits the HARQ feedback in multiple repetitions, the base station may provide signaling to the UE to indicate from which of the multiple repetitions to measure the end of the DCI or the end of the HARQ feedback. In cases where cross-carrier activation is used, the DCI may be received via a scheduling component carrier to activate a downlink beam, an uplink beam, a reference signal, and/or the like on a scheduled component carrier. In such cases, the quantity of symbols may have a numerology and/or a value that depends on a numerology of the scheduling component carrier, the scheduled component carrier, or both the scheduling component carrier and the scheduled component carrier (e.g., when the scheduling component carrier and the scheduled component carrier have the same numerology). In this way, the base station may activate beam configurations and/or reference signal configurations for the UE using physical layer signaling, which reduces latency and overhead relative to higher-layer signaling, thereby conserving computing resources. This may be particularly beneficial for UEs associated with frequent beam configuration changes. Furthermore, defining an action time at which and/or after which a beam activation command and/or a reference signal activation command is to be applied may increase a reliability of communications via one or more downlink and/or uplink beams that are activated via the physical layer signaling, FIGS. 3A-3B are diagrams illustrating one or more examples 300 of an action time for applying a DCI based beam activation and/or a DCI based reference signal activation command, in accordance with various aspects of the present disclosure. As shown in FIG. 3, example(s) 300 include communication between a base station (e.g., base station 110) and a UE (e.g., UE 120). In some aspects, the base station and the UE may be included in a wireless network, such as wireless network 100. In some aspects, the base station and the UE may communicate on an access link, which may include an uplink and a downlink. For example, the UE may receive information transmitted by the base station using a downlink (receive) beam that is paired with a downlink (transmit) beam at the base station. Similarly, the UE may transmit information to the base station using an uplink (transmit) beam that is paired with an uplink (receive) beam at the base station. In some aspects, a TCI state may generally define a pairing between a downlink receive beam and a downlink transmit beam, a pairing between an uplink receive beam and an uplink transmit beam, and/or the like.

Accordingly, in some aspects, the base station and the UE may be capable of multi-beam operation on the uplink and/or the downlink. For example, the base station and the UE may communicate on the downlink using one or more downlink beams, may communicate on the uplink using one or more uplink beams, and/or the like. In some aspects, the base station and/or the UE may be capable of downlink and/or uplink beam management. In this case, the base station may be capable of configuring one or more beam management parameters, activating and/or deactivating one or more downlink and/or uplink beams, and/or the like. As an example, the base station may configure, activate, and/or deactivate one or more downlink and/or uplink TCI states, such as PDCCH TCI states, PDSCH TCI states, CSI-RS TCI states, PUCCH TCI states, PUSCH TCI states, PRACH TCI states, SRS TCI states, and/or the like. As another example, the base station may configure, activate, and/or deactivate uplink spatial relations (e.g., PUCCH spatial relations, SRS spatial relations, and/or the like), which may include information related to beam and/or base station co-location parameters, quasi-co-location parameters, and/or the like.

In some aspects, the base station may configure one or more reference signal parameters, activate and/or deactivate reference signal transmission for the UE, and/or the like. For example, in some aspects, the base station may configure, activate, and/or deactivate a path loss reference signal that the base station and the UE may use to track, manage, and compensate for mobility of the base station and/or the UE in the wireless network. For example, the base station may configure path loss reference signal parameters that indicate time-frequency resources in which the UE is to transmit the path loss reference signal, that configure the UE to periodically, semi-persistently, or aperiodically transmit the path loss reference signal, and/or the like.

As shown in FIG. 3A, and by reference number 310, the base station may transmit, and the UE may receive, DCI that includes a downlink and/or uplink beam activation command and/or a reference signal activation command. In some aspects, the base station may transmit the DCI that includes the downlink and/or uplink beam activation command and/or the reference signal activation command to manage downlink and/or uplink beams and/or reference signals for the UE. In some aspects, the base station may transmit the DCI including the downlink and/or uplink beam activation command and/or the reference signal activation command based at least in part on inter-cell or intra-cell mobility of the base station and/or the UE. Furthermore, in some aspects, the base station may transmit the downlink and/or uplink beam activation command and/or the reference signal activation command in DCI (rather than an RRC message or a MAC-CE) to reduce latency and overhead associated with managing the downlink and/or uplink beams and/or the reference signals for the UE.

In some aspects, when the DCI includes a downlink and/or uplink beam activation command, the downlink and/or uplink beam activation command may include information to activate one or more downlink beams and/or one or more uplink beams. For example, the beam activation command may include information to activate a downlink TCI state for a PDCCH, a downlink TCI state for a PDSCH, a downlink TCI state for a CSI-RS, an uplink TCI state for PUCCH, an uplink TCI state for a PUSCH, an uplink TCI state for a PRACH, an uplink TCI state for an SRS, a spatial relation for a PUCCH, a spatial relation for an SRS, and/or the like. In this case, as described herein, the UE may activate one or more downlink and/or uplink beams, one or more downlink and/or uplink TCI states, one or more spatial relations, and/or the like according to an action time that is based at least in part on an event related to reception of the DCI.

Additionally, or alternatively, when the DCI includes a reference signal activation command, the reference signal activation command may include information to activate a path loss reference signal on a PUCCH, on a PUSCH, for an SRS, and/or the like. In this case, as described herein, the UE may transmit the path loss reference signal after applying the reference signal activation command, which may occur at or after an action time based at least in part on an event related to reception of the DCI.

As further shown in FIG. 3A, and by reference number 312, the action time may be measured as a quantity of symbols (X symbols) after an end of the DCI that includes the downlink and/or uplink beam activation command or the reference signal activation command. For example, in some aspects, the X symbols may be measured from the end of the DCI that includes the downlink and/or uplink beam activation command or the reference signal activation command in cases where the UE is not configured to transmit HARQ feedback for the DCI. In some circumstances, the base station may be configured to transmit the DCI that includes the downlink and/or uplink beam activation command or the reference signal activation command in multiple PDCCH repetitions. In this case, the X symbols may be measured from the end of one of the multiple PDCCH repetitions, such as a first PDCCH repetition, a last PDCCH repetition, or another one of the multiple PDCCH repetitions. In some aspects, the base station may transmit, and the UE may receive, signaling to indicate from which of the multiple PDCCH repetitions the X symbols are to be measured. For example, the signaling may include an RRC message, a MAC-CE, DCI, and/or the like.

Additionally, or alternatively, as shown in FIG. 3B, and by reference number 320, the UE may be configured to transmit HARQ feedback that includes an acknowledgement or a negative acknowledgement for the DCI. For example, the HARQ feedback may include an acknowledgement to indicate that the UE successfully decoded the DCI, or the HARQ feedback may include the negative acknowledgement to indicate that decoding of the DCI was unsuccessful. In some aspects, the UE may determine whether to transmit the HARQ feedback for the DCI communication based at least in part on a HARQ feedback rule (e.g., an acknowledgement/negative acknowledgement rule), which may be configured or hard coded at the UE, identified in a table, a specification, or another data structure, and/or the like. In this way, the HARQ feedback may increase reliability of the DCI carrying the downlink and/or uplink beam activation command and/or the reference signal activation command, because the HARQ feedback can indicate that the DCI communication was successfully received or prompt the base station to retransmit the DCI (e.g., if the HARQ feedback includes a negative acknowledgement to indicate that the UE was unable to decode the DCI, or the base station does not receive HARQ feedback including an acknowledgement to indicate that the DCI communication was successfully received).

As further shown in FIG. 3B, and by reference number 322, the action time may be measured as a quantity of symbols (X symbols) after an end of the HARQ feedback for the DCI in cases where the UE is configured to transmit HARQ feedback. For example, in some aspects, the X symbols may be measured from the end of the HARQ feedback that includes the acknowledgement or negative acknowledgement for the downlink and/or uplink beam activation command or the reference signal activation command included in the DCI. In some circumstances, the UE may be configured to transmit the HARQ feedback in multiple uplink repetitions, which may include one or more PUCCH repetitions, one or more PUSCH repetitions, and/or the like. In this case, the X symbols may be measured from the end of one of the multiple uplink repetitions, such as a first uplink repetition, a last uplink repetition, or another one of the multiple uplink repetitions that carry the HARQ feedback. In some aspects, the base station may transmit, and the UE may receive, signaling to indicate from which of the multiple uplink repetitions to measure the X symbols that define the action time. For example, the signaling may include an RRC message, a MAC-CE, DCI, and/or the like.

In some aspects, as shown in FIGS. 3A-3B, and by reference number 330, the UE may apply the downlink and/or uplink beam activation command or the reference signal activation command according to the action time (e.g., X symbols after the end of the DCI carrying the downlink and/or uplink beam activation command or the reference signal activation command, X symbols after the end of the HARQ feedback for the DCI carrying the downlink and/or uplink beam activation command or the reference signal activation command, and/or the like). In some aspects, the quantity of symbols used to measure the action time at which or after which the downlink and/or uplink beam activation command or the reference signal activation command is to be applied may have a fixed value. For example, X may be a fixed quantity (e.g., defined in a specification or a wireless communication standard) when a scheduling component carrier used to transmit the DCI and a scheduled component carrier on which the beam activation command or the reference signal activation command is applied have the same numerology (e.g., X may have a fixed value, such as 28 symbols, when the scheduling component carrier and the scheduled component carrier have a subcarrier spacing of 120 kHz). Additionally, or alternatively, X may be a fixed quantity regardless of a numerology associated with the scheduling component carrier and/or the scheduled component carrier.

In some aspects, as described above, the DCI carrying the downlink and/or uplink beam activation command or the reference signal activation command may be transmitted via a scheduling component carrier, and the downlink and/or uplink beam activation command or the reference signal activation command included in the DCI may be applied on a scheduled component carrier. Accordingly, in cases of cross-carrier aggregation (e.g., where the scheduling component carrier is different from the scheduled component carrier), a numerology and a value for the quantity of symbols may be based at least in part on a numerology of the scheduling component carrier, a numerology of the scheduled component carrier, or a numerology of the scheduling component carrier and the scheduled component carrier (e.g., when the scheduling component carrier and the scheduled component carrier have the same numerology). For example, in some aspects, the numerology of the quantity of symbols may be the same as the scheduling component carrier, the scheduled component carrier, one of the scheduling component carrier and the scheduled component carrier that has a smallest numerology, one of the scheduling component carrier and the scheduled component carrier that has a largest numerology, and/or the like. Furthermore, the value of the quantity of symbols may be fixed or a function of the numerology of the scheduling and/or scheduled component carrier. In one example, the function may include a fixed offset and a variable term that includes one or more scaled parameters that are based at least in part on a subcarrier spacing of the scheduling and/or scheduled component carrier. For example, in cases where the fixed offset is 28 symbols, the quantity of symbols defining the action time may be $\{4\times8, 4\times4, 8\times2, 12\times1\}+28=\{60, 44, 44, 40\}$ symbols in terms of the numerology of the scheduled component carrier if the scheduling component carrier has a subcarrier spacing of $\{15, 30, 60, 120\}$ kHz and the scheduled component carrier has a subcarrier spacing of 120 kHz.

As further shown in FIGS. 3A-3B, and by reference number 340, the UE and the base station may communicate using one or more beams that are configured according to the downlink and/or uplink beam activation command and/or the reference signal activation command after the command(s) included in the DCI have been applied. For example, as described above, the UE may apply a downlink beam activation command to activate a downlink TCI state to receive a PDCCH communication, a downlink TCI state to receive a PDSCH communication, a downlink TCI state to receive a CSI-RS communication, and/or the like. Additionally, or alternatively, the UE may apply an uplink beam activation command to activate an uplink TCI state to transmit a PUCCH communication, an uplink TCI state to transmit a PUSCH communication, an uplink TCI state to transmit a PRACH communication, an uplink TCI state to transmit an SRS communication, to activate a spatial relation for a PUCCH and/or SRS communication, and/or the like. Additionally, or alternatively, the UE may apply a reference signal activation command to activate a path loss reference signal, which may be transmitted in a PUCCH communication, a PUSCH communication, an SRS communication, and/or the like.

As indicated above, FIGS. 3A-3B are provided as one or more examples. Other examples may differ from what is described with respect to FIGS. 3A-3B.

Figure 4:
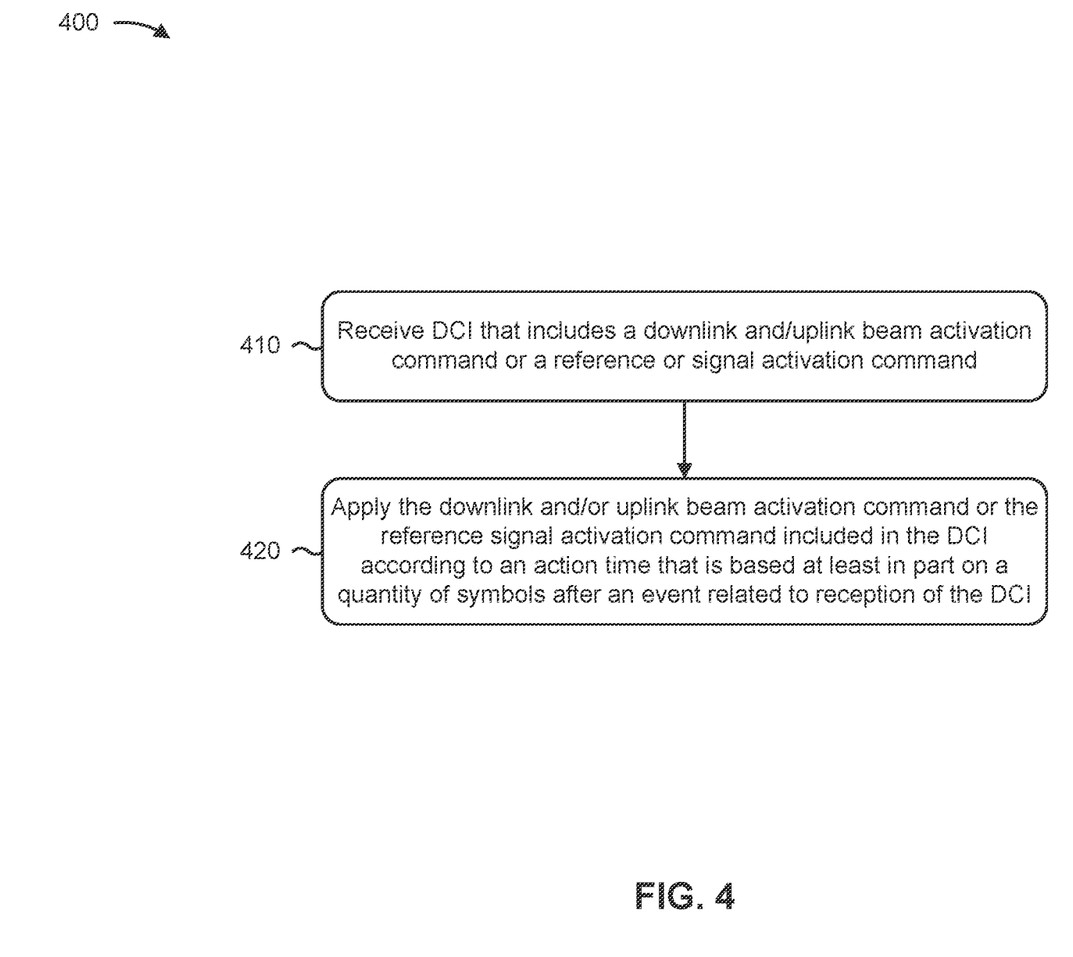
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120 and/or the like) performs operations associated with an action time for applying a DCI based beam activation command and/or a DCI based reference signal activation command.

As shown in FIG. 4, in some aspects, process 400 may include receiving DCI that includes a downlink and/or uplink beam activation command or a reference signal activation command (block 410). For example, the UE may receive (e.g., using antenna 252, DEMOD 254, MIMO detector 256, receive processor 258, controller/processor 280, and/or the like) DCI that includes a downlink and/or uplink beam activation command or a reference signal activation command, as described above.

As further shown in FIG. 4, in some aspects, process 400 may include applying the downlink and/or uplink beam activation command or the reference signal activation command included in the DCI according to an action time that is based at least in part on a quantity of symbols after an event related to reception of the DCI (block 420). For example, the UE may apply (e.g., using antenna 252, DEMOD 254, MIMO detector 256, receive processor 258, controller/processor 280, transmit processor 264, TX MIMO processor 266, MOD 254, antenna 252, and/or the like) the downlink and/or uplink beam activation command or the reference signal activation command included in the DCI according to an action time that is based at least in part on a quantity of symbols after an event related to reception of the DCI, as described above.

Process 400 may include additional aspects, such as any single aspect or any combination of aspects described below and/or in connection with one or more other processes described elsewhere herein.

In a first aspect, the downlink and/or uplink beam activation command includes information to activate a downlink TCI state for a PDCCH, a PDSCH, or a CSI-RS, an uplink TCI state for a PUCCH, a PUSCH, a PRACH, or an SRS, a spatial relation for a PUCCH or an SRS, and/or the like. In a second aspect, alone or in combination with the first aspect, the reference signal activation command includes information to activate a path loss reference signal for a PUCCH, a PUSCH, an SRS, and/or the like.

In a third aspect, alone or in combination with one or more of the first and second aspects, the action time is measured as the quantity of symbols from an end of the DCI that includes the downlink and/or uplink beam activation command or the reference signal activation command. In a fourth aspect, alone or in combination with one or more of the first through third aspects, the DCI is received in multiple PDCCH repetitions, and the end of the DCI is measured from an end of one of the multiple PDCCH repetitions. In a fifth aspect, alone or in combination with one or more of the first through fourth aspects, process 400 includes receiving signaling to indicate the one of the multiple PDCCH repetitions from which to measure the end of the DCI, where the signaling includes RRC signaling, a MAC-CE, and/or DCI.

In a sixth aspect, alone or in combination with one or more of the first through fifth aspects, process 400 includes transmitting HARQ feedback for the DCI, where the action time is measured as the quantity of symbols from an end of the HARQ feedback. In a seventh aspect, alone or in combination with one or more of the first through sixth aspects, the HARQ feedback is transmitted in multiple uplink repetitions, and the end of the HARQ feedback is measured from an end of one of the multiple uplink repetitions. In an eighth aspect, alone or in combination with one or more of the first through seventh aspects, process 400 includes receiving signaling to indicate the one of the multiple uplink repetitions from which to measure the end of the HARQ feedback, wherein the signaling includes RRC signaling, a MAC-CE, and/or DCI. In a ninth aspect, alone or in combination with one or more of the first through eighth aspects, the HARQ feedback is transmitted via a PUCCH or a PUSCH.

In a tenth aspect, alone or in combination with one or more of the first through ninth aspects, the quantity of symbols has a numerology and a value that are based on a scheduling component carrier via which the DCI is received or a scheduled component carrier associated with the downlink and/or uplink beam activation command or the reference signal activation command included in the DCI. In an eleventh aspect, alone or in combination with one or more of the first through tenth aspects, the numerology of the quantity of symbols corresponds to a numerology of the scheduling component carrier and/or the scheduled component carrier. In a twelfth aspect, alone or in combination with one or more of the first through eleventh aspects, the numerology of the quantity of symbols corresponds to a smallest numerology among the scheduling component carrier and the scheduled component carrier. In a thirteenth aspect, alone or in combination with one or more of the first through twelfth aspects, the numerology of the quantity of symbols corresponds to a largest numerology among the scheduling component carrier and the scheduled component carrier. In a fourteenth aspect, alone or in combination with one or more of the first through thirteenth aspects, the value of the quantity of symbols is based at least in part on one or more of a numerology of the scheduling component carrier or a numerology of the scheduled component carrier. In a fifteenth aspect, alone or in combination with one or more of the first through fourteenth aspects, the quantity of symbols has a fixed value.

In a sixteenth aspect, alone or in combination with one or more of the first through fifteenth aspects, process 400 includes receiving a communication on a downlink beam, which is configured to receive the communication based at least in part on one or more of the downlink and/or uplink beam activation command or the reference signal activation command. In a seventeenth aspect, alone or in combination with one or more of the first through sixteenth aspects, process 400 includes transmitting a communication on an uplink beam, which is configured to transmit the communication based at least in part on one or more of the downlink and/or uplink beam activation command or the reference signal activation command.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
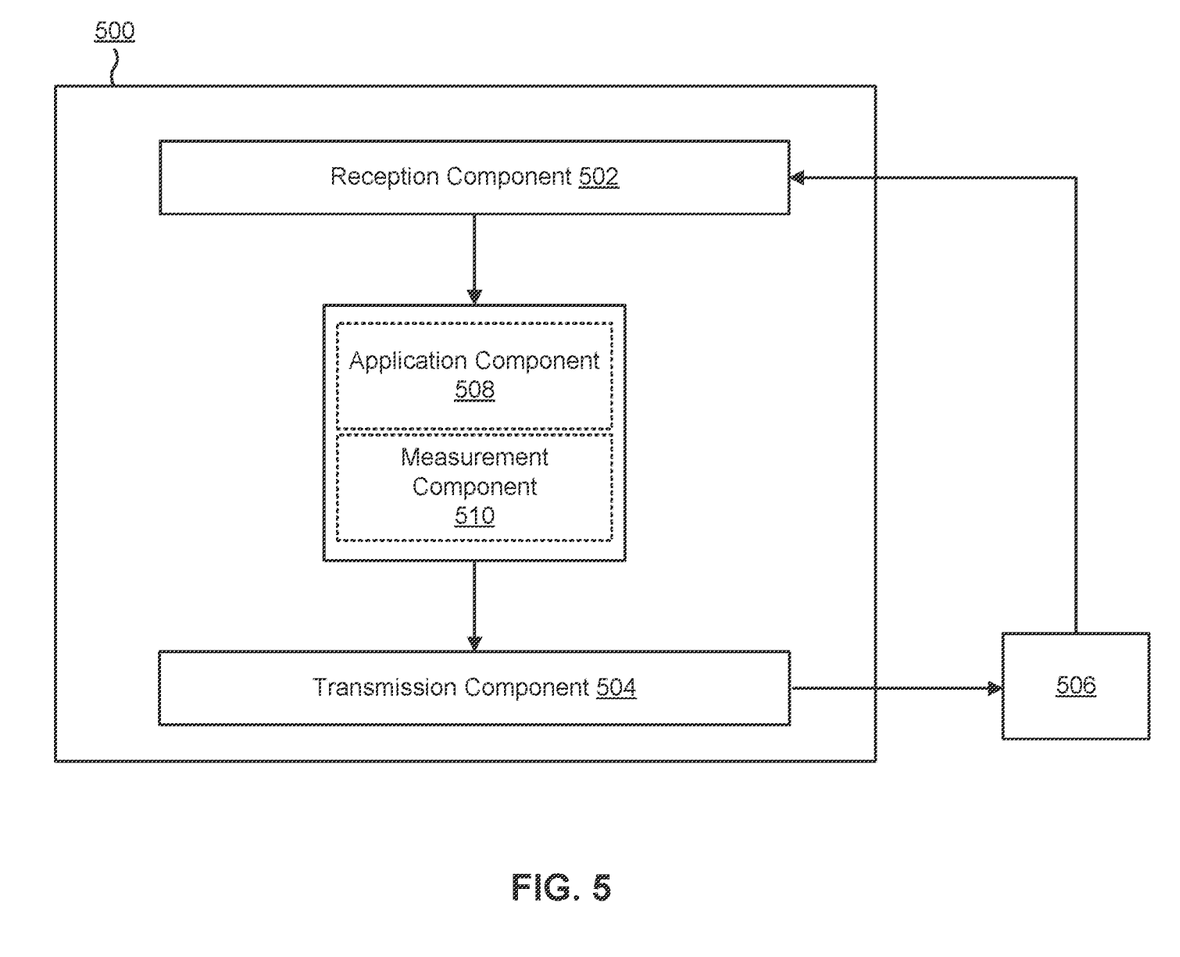
FIG. 5 is a block diagram of an example apparatus for wireless communication, in accordance with various aspects of the present disclosure.

FIG. 5 is a block diagram of an example apparatus 500 for wireless communication. The apparatus 500 may be a UE, or a UE may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include one or more of an application component 508 or a measurement component 510, among other examples.

In some aspects, the apparatus 500 may be configured to perform one or more operations described herein in connection with FIGS. 3A-3B. Additionally or alternatively, the apparatus 500 may be configured to perform one or more processes described herein, such as process 400 of FIG. 4 or a combination thereof. In some aspects, the apparatus 500 and/or one or more components shown in FIG. 5 may include one or more components of the UE described above in connection with FIG. 2. Additionally, or alternatively, one or more components shown in FIG. 5 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 506. In some aspects, the reception component 502 may include one or more antennas, a demodulator, a MIMO detector, a receive processor, a controller/processor, a memory, or a combination thereof, of the UE described above in connection with FIG. 2.

The transmission component 504 may transmit communications, such as reference signals, control information, data communications, or a combination thereof, to the apparatus 506. In some aspects, one or more other components of the apparatus 506 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modulator, a transmit MIMO processor, a transmit processor, a controller/processor, a memory, or a combination thereof, of the UE described above in connection with FIG. 2. In some aspects, the transmission component 504 may be collocated with the reception component 502 in a transceiver.

The reception component 502 may receive DCI that includes a downlink and/or uplink beam activation command or a reference signal activation command. The application component 508 may apply the downlink and/or uplink beam activation command or the reference signal activation command included in the DCI according to an action time that is based at least in part on a quantity of symbols after an event related to reception of the DCI. In some aspects, the application component 508 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The measurement component 510 may measure the action time as the quantity of symbols from an end of the DCI that includes the downlink and/or uplink beam activation command or the reference signal activation command. In some aspects, the measurement component 510 may include a controller/processor, a memory, or a combination thereof, of the UE described above in connection with FIG. 2.

In some aspects, the DCI is received in multiple PDCCH repetitions, and the measurement component 510 may measure the end of the DCI from an end of one of the multiple PDCCH repetitions.

The reception component 502 may receive signaling to indicate the one of the multiple PDCCH repetitions from which to measure the end of the DCI, wherein the signaling includes at least one of RRC signaling, a MAC-CE, or DCI.

The transmission component 504 may transmit HARQ feedback for the DCI, and the measurement component 510 may measure the action time as the quantity of symbols from an end of the HARQ feedback.

In some aspects, the HARQ feedback is transmitted in multiple uplink repetitions, and the measurement component 510 measures the end of the HARQ feedback from an end of one of the multiple uplink repetitions.

The reception component 502 may receive signaling to indicate the one of the multiple uplink repetitions from which to measure the end of the HARQ feedback, wherein the signaling includes at least one of RRC signaling, a MAC-CE, or DCI.

The reception component 502 may receive a communication on a downlink beam, wherein the downlink beam is configured to receive the communication based at least in part on one or more of the downlink and/or uplink beam activation command or the reference signal activation command.

The transmission component 504 may transmit a communication on an uplink beam, wherein the uplink beam is configured to transmit the communication based at least in part on one or more of the downlink and/or uplink beam activation command or the reference signal activation command.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally or alternatively, a set of (one or more) components shown in FIG. 5 may perform one or more functions described as being performed by another set of components shown in FIG. 5.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving downlink control information (DCI) that switches an active beam configuration from a first uplink beam configuration to a second uplink beam configuration, wherein the active beam configuration comprises a beam configuration of a path loss reference signal for at least one of a physical uplink control channel (PUCCH), a physical uplink shared channel (PUSCH), or a sounding reference signal (SRS); and
    applying the second uplink beam configuration according to an action time that is based at least in part on a quantity of symbols after an event related to reception of the DCI.

2. The method of claim 1, wherein the active beam configuration included in the DCI includes information to activate at least one of:
    a downlink transmission configuration indication (TCI) state for one or more of a physical downlink control channel (PDCCH), a physical downlink shared channel (PDSCH), or a channel state information reference signal,
    an uplink TCI state for one or more of the PUCCH, the PUSCH, a physical random access channel, or the SRS, or
    a spatial relation for one or more of the PUCCH or the SRS.

3. The method of claim 1, wherein the action time is measured as the quantity of symbols from an end of the DCI.

4. The method of claim 3, wherein the DCI is received in multiple physical downlink control channel (PDCCH) repetitions, and wherein the end of the DCI is measured from an end of one of the multiple PDCCH repetitions.

5. The method of claim 4, further comprising:
    receiving signaling to indicate the one of the multiple PDCCH repetitions from which to measure the end of the DCI, wherein the signaling includes at least one of radio resource control signaling, a medium access control element, or DCI.

6. The method of claim 1, further comprising:
    transmitting hybrid automatic repeat request (HARQ) feedback for the DCI, wherein the action time is measured as the quantity of symbols from an end of the HARQ feedback.

7. The method of claim 6, wherein the HARQ feedback is transmitted in multiple uplink repetitions, and wherein the end of the HARQ feedback is measured from an end of one of the multiple uplink repetitions.

8. The method of claim 7, further comprising:
    receiving signaling to indicate the one of the multiple uplink repetitions from which to measure the end of the HARQ feedback, wherein the signaling includes at least one of radio resource control signaling, a medium access control element, or DCI.

9. The method of claim 6, wherein the HARQ feedback is transmitted via a physical uplink control channel or a physical uplink shared channel.

10. The method of claim 1, wherein the quantity of symbols has a numerology and a value that are based on one or more of a scheduling component carrier via which the DCI is received or a scheduled component carrier associated with the active beam configuration.

11. The method of claim 10, wherein the numerology of the quantity of symbols corresponds to a numerology of one or more of the scheduling component carrier or the scheduled component carrier.

12. The method of claim 10, wherein the numerology of the quantity of symbols corresponds to a smallest numerology or a largest numerology among the scheduling component carrier and the scheduled component carrier.

13. The method of claim 10, wherein the value of the quantity of symbols is based at least in part on one or more of a numerology of the scheduling component carrier or a numerology of the scheduled component carrier.

14. The method of claim 1, wherein the quantity of symbols has a fixed value.

15. The method of claim 1, further comprising:
transmitting a communication based on the second uplink beam configuration, wherein the communication is transmitted after the action time.

16. The method of claim 15, wherein transmitting the communication on the uplink beam comprises:
activating an uplink transmission configuration indicator (TCI) state to transmit one or more of:
a PUCCH communication,
a PUSCH communication,
a physical random access channel (PRACH) communication, or
an SRS communication.

17. The method of claim 15, wherein transmitting the communication on the uplink beam comprises:
activating an uplink transmission configuration indicator (TCI) state to activate one or more of:
a spatial relation for the PUCCH, or
a spatial relation for an SRS communication.

18. A user equipment (UE) for wireless communication, comprising:
a memory; and
one or more processors coupled to the memory, the one or more processors configured to:
receive downlink control information (DCI) that switches an active beam configuration from a first uplink beam configuration to a second uplink beam configuration, wherein the active beam configuration comprises a beam configuration of a path loss reference signal for at least one of a physical uplink control channel (PUCCH), a physical uplink shared channel (PUSCH), or a sounding reference signal (SRS); and
apply the second uplink beam configuration indicated by the DCI according to an action time that is based at least in part on a quantity of symbols after an event related to reception of the DCI.

19. The UE of claim 18, wherein the active beam configuration includes information to activate at least one of:
a downlink transmission configuration indication (TCI) state for one or more of a physical downlink control channel (PDCCH), a physical downlink shared channel (PDSCH), or a channel state information reference signal,
an uplink TCI state for one or more of the PUCCH, the PUSCH, a physical random access channel, or the SRS, or
a spatial relation for one or more of the PUCCH or the SRS.

20. The UE of claim 18, wherein the action time is measured as the quantity of symbols from an end of the DCI.

21. The UE of claim 20, wherein the DCI is received in multiple physical downlink control channel (PDCCH) repetitions, and wherein the end of the DCI is measured from an end of one of the multiple PDCCH repetitions.

22. The UE of claim 18, wherein the one or more processors are further configured to:
transmit hybrid automatic repeat request (HARQ) feedback for the DCI, wherein the action time is measured as the quantity of symbols from an end of the HARQ feedback.

23. The UE of claim 22, wherein the HARQ feedback is transmitted in multiple uplink repetitions, and wherein the end of the HARQ feedback is measured from an end of one of the multiple uplink repetitions.

24. The UE of claim 23, wherein the one or more processors are further configured to:
receive signaling to indicate the one of the multiple uplink repetitions from which to measure the end of the HARQ feedback, wherein the signaling includes at least one of radio resource control signaling, a medium access control control element, or DCI.

25. The UE of claim 22, wherein the HARQ feedback is transmitted via a physical uplink control channel or a physical uplink shared channel.

26. The UE of claim 18, wherein the quantity of symbols has a fixed value.

27. The UE of claim 18, wherein the one or more processors are further configured to:
transmit a communication based on the second uplink beam configuration, wherein the communication is transmitted after the action time.

28. A non-transitory computer-readable medium storing one or more instructions for wireless communication, the one or more instructions comprising:
one or more instructions that, when executed by one or more processors of a user equipment, cause the one or more processors to:
receive downlink control information (DCI) that switches an active beam configuration from a first uplink beam configuration to a second uplink beam configuration, wherein the active beam configuration comprises a beam configuration of a path loss reference signal for at least one of a physical uplink control channel (PUCCH), a physical uplink shared channel (PUSCH), or a sounding reference signal (SRS); and
apply the second uplink beam configuration according to an action time that is based at least in part on a quantity of symbols after an event related to reception of the DCI.

29. The non-transitory computer-readable medium of claim 28, wherein the quantity of symbols has a numerology and a value that are based on one or more of a scheduling component carrier via which the DCI is received or a scheduled component carrier associated with the active beam configuration.

30. The non-transitory computer-readable medium of claim 29, wherein the numerology of the quantity of symbols corresponds to a numerology of the scheduling component carrier or the scheduled component carrier.

31. The non-transitory computer-readable medium of claim 28, wherein the action time is measured as the quantity of symbols from an end of the DCI.

32. An apparatus for wireless communication, comprising:
- means for receiving downlink control information (DCI) that switches an active beam configuration from a first uplink beam configuration to a second uplink beam configuration, wherein the active beam configuration comprises a beam configuration of a path loss reference signal for at least one of a physical uplink control channel (PUCCH), a physical uplink shared channel (PUSCH), or a sounding reference signal (SRS); and
- means for applying the second uplink beam configuration according to an action time that is based at least in part on a quantity of symbols after an event related to reception of the DCI.

33. The apparatus of claim 32, wherein the quantity of symbols has a numerology and a value that are based on one or more of a scheduling component carrier via which the DCI is received or a scheduled component carrier associated with the active beam configuration.

34. The apparatus of claim 33, wherein the numerology of the quantity of symbols corresponds to a numerology of one or more of the scheduling component carrier or the scheduled component carrier.

* * * * *